United States Patent

Jeon

(10) Patent No.: US 12,159,035 B2
(45) Date of Patent: Dec. 3, 2024

(54) PERIPHERAL COMPONENT INTERCONNECT EXPRESS INTERFACE DEVICE AND OPERATING METHOD THEREOF

(71) Applicant: SK hynix Inc., Gyeonggi-do (KR)

(72) Inventor: Yong Tae Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 141 days.

(21) Appl. No.: 17/481,503

(22) Filed: Sep. 22, 2021

(65) Prior Publication Data

US 2022/0326855 A1 Oct. 13, 2022

(30) Foreign Application Priority Data

Apr. 13, 2021 (KR) .......................... 10-2021-0048090

(51) Int. Cl.
*G06F 3/06* (2006.01)
*G06F 13/42* (2006.01)

(52) U.S. Cl.
CPC .......... *G06F 3/0613* (2013.01); *G06F 3/0653* (2013.01); *G06F 3/0689* (2013.01); *G06F 13/4221* (2013.01); *G06F 2213/0026* (2013.01)

(58) Field of Classification Search
CPC .... G06F 3/0613; G06F 3/0653; G06F 3/0689; G06F 13/4221; G06F 2313/0026
See application file for complete search history.

(56) References Cited

U.S. PATENT DOCUMENTS

| | | |
|---|---|---|
| 9,535,740 B1 | 1/2017 | Graham et al. |
| 10,097,636 B1 | 10/2018 | Maroney |
| 10,162,793 B1 | 12/2018 | Bshara et al. |
| 11,175,984 B1 | 11/2021 | Lercari et al. |
| 2004/0123002 A1 | 6/2004 | Bennett et al. |
| 2006/0224851 A1 | 10/2006 | Tamura et al. |
| 2008/0034147 A1* | 2/2008 | Stubbs ................ G06F 13/4018 710/315 |

(Continued)

FOREIGN PATENT DOCUMENTS

| | | |
|---|---|---|
| CN | 104965677 A | 10/2015 |
| CN | 108255410 A | 7/2018 |

(Continued)

OTHER PUBLICATIONS

Office Action for the U.S. Appl. No. 17/483,179 issued by the USPTO on Oct. 4, 2022.

(Continued)

*Primary Examiner* — David E Martinez
(74) *Attorney, Agent, or Firm* — IP & T GROUP LLP

(57) ABSTRACT

An electronic device, and more particularly, a Peripheral Component Interconnect Express (PCIe) interface device is provided. The PCIe interface device includes a root complex configured to support a PCIe port which is a root port that could be coupled to an input/output (I/O) device, a plurality of endpoints each coupled to the root complex through a link, and a Redundant Array of Independent Disks (RAID) controller configured to control RAID-coupling of a plurality of storage devices that are respectively coupled to the plurality of endpoints, wherein the RAID controller requests a host to allocate a capacity to each function in the plurality of storage devices based on a reference capacity.

19 Claims, 11 Drawing Sheets

(56) References Cited

U.S. PATENT DOCUMENTS

Figure 1:
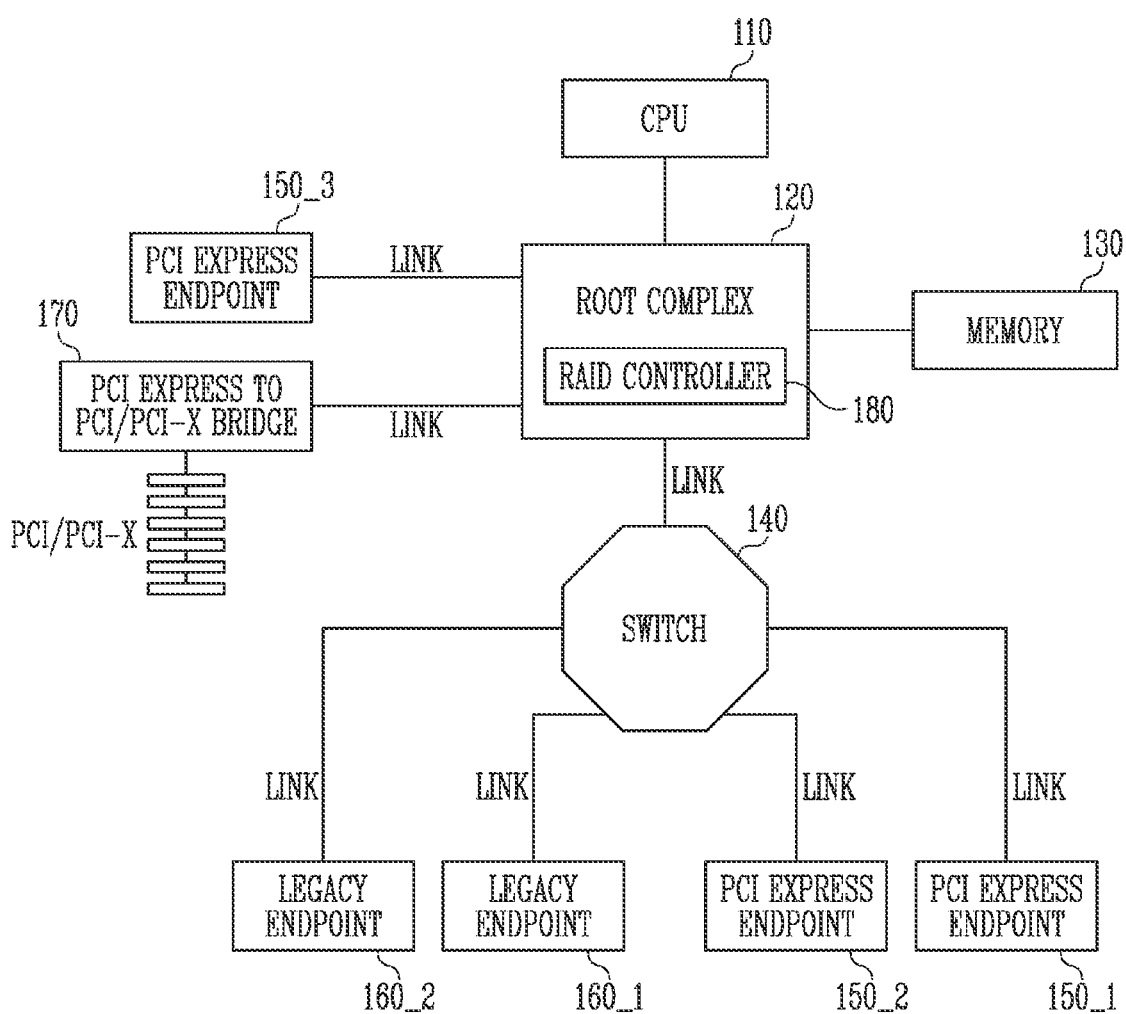

| | | | |
|---|---|---|---|
| 2011/0179219 A1* | 7/2011 | Ma | G06F 12/0246 |
| | | | 711/E12.008 |
| 2012/0271998 A1 | 10/2012 | Galloway et al. | |
| 2013/0246726 A1* | 9/2013 | Kirstenpfad | G06F 16/10 |
| | | | 711/170 |
| 2014/0281169 A1* | 9/2014 | Mehrotra | G06F 12/0866 |
| | | | 711/103 |
| 2015/0301749 A1 | 10/2015 | Seo et al. | |
| 2016/0110111 A1* | 4/2016 | Song | G06F 3/0688 |
| | | | 711/103 |
| 2017/0337069 A1* | 11/2017 | Huang | G06F 13/4282 |
| 2018/0074757 A1 | 3/2018 | Yamaguchi et al. | |
| 2018/0101450 A1 | 4/2018 | Park et al. | |
| 2018/0300265 A1 | 10/2018 | Roberts et al. | |
| 2019/0034306 A1 | 1/2019 | Wysocki et al. | |
| 2020/0004429 A1 | 1/2020 | Schmisseur et al. | |
| 2020/0073840 A1* | 3/2020 | Mekad | G06F 13/4022 |
| 2020/0081650 A1 | 3/2020 | Herrell et al. | |
| 2020/0133777 A1 | 4/2020 | Lesartre et al. | |
| 2021/0042255 A1* | 2/2021 | Colenbrander | A63F 13/352 |
| 2021/0216388 A1* | 7/2021 | Kumar | G06F 11/079 |

FOREIGN PATENT DOCUMENTS

| | | |
|---|---|---|
| JP | 2011-141842 A | 7/2011 |
| JP | 2012-128782 A | 7/2012 |
| KR | 10-2010-0107281 A | 10/2010 |
| KR | 10-2014-0067404 A | 6/2014 |
| KR | 1020150067583 A | 6/2015 |
| KR | 10-2015-0121502 A | 10/2015 |
| KR | 1020170027922 A | 3/2017 |
| KR | 1020180022515 A | 3/2018 |
| KR | 10-2018-0038813 A | 4/2018 |
| KR | 101930117 B1 | 12/2018 |
| KR | 1020190061473 A | 6/2019 |
| KR | 10-2020-0017363 A | 2/2020 |

OTHER PUBLICATIONS

Office Action for the Korean Patent Application No. 10-2021-0044873 issued by the Korean Intellectual Property Office on Apr. 20, 2023.

Jingfeng Guo et al., I/O Virtualization Design of FCoE Adapter, 2015 International Conference on Network and Information Systems for Computers, Wuhan, China 2015, pp. 18-21, doi: 10.1109/ICNISC.2015.78. (Year: 2015).

Notice of Allowance for the U.S. Appl. No. 17/574,266 issued by the USPTO on Feb. 15, 2023.

Office Action for the U.S. Appl. No. 17/483,179 issued by the USPTO on Mar. 9, 2023.

Notice of Allowance for the Korean Patent Application No. 10-2021-0048090 issued by the Korean Patent Office on Mar. 28, 2023.

Notice of Allowance for the Korean Patent Application No. 10-2021-0044873 issued by the Korean Patent Office on Jul. 6, 2023.

Office Action for the U.S. Appl. No. 18/316,241 issued by the USPTO on Dec. 14, 2023.

Office Action for the U.S. Appl. No. 18/316,241 issued by the USPTO on May 8, 2024.

Notice of Allowance for U.S. Appl. No. 18/316,241 issued by the USPTO on Sep. 17, 2024.

Office Action for the U.S. Appl. No. 17/483,179 issued by the USPTO on Sep. 25, 2024.

* cited by examiner

PERIPHERAL COMPONENT INTERCONNECT EXPRESS INTERFACE DEVICE AND OPERATING METHOD THEREOF

CROSS-REFERENCE TO RELATED APPLICATION

The present application claims priority under 35 U.S.C. § 119(a) to Korean patent application number 10-2021-0048090, filed on Apr. 13, 2021, and which is incorporated herein by reference in its entirety.

BACKGROUND

Field of Invention

Various embodiments of the present invention generally relate to an electronic device, and more particularly, to a PCIe interface device and an operating method thereof.

Description of Related Art

Peripheral Component Interconnect Express (PCIe) is an interface having a serial architecture for data communication. A PCIe-based storage device may support a multi-port and a multi-function. The PCIe-based storage device may be virtualized or non-virtualized, and may achieve Quality of Service (QoS) of a host input/output (I/O) command through one or more PCIe functions.

A storage device may store data in response to control of a host device such as a computer or a smartphone. A storage device may include a root complex configured to support a PCIe port which is a root port that could be coupled to an input/output (I/O) device, a plurality of endpoints each coupled to the root complex through a link, and a Redundant Array of Independent Disks (RAID) controller configured to control RAID-coupling of a plurality of storage devices that are respectively coupled to the plurality of endpoints, wherein the RAID controller is further configured to request a host to allocate a capacity to each function in the plurality of storage devices based on a reference capacity.

According to an embodiment of the present disclosure, a method of operating a Peripheral Component Interconnect Express (PCIe) interface device, which includes a Redundant Array of Independent Disks (RAID) controller that controls RAID-coupling of a plurality of storage devices, may include receiving, from the plurality of storage devices, pieces of size information indicating capacities of the respective storage devices, setting a reference capacity based on the pieces of size information, and requesting a host to allocate a capacity to each function in the plurality of storage devices based on the reference capacity.

According to an embodiment of the present disclosure, an operating method of a system including a host, a Peripheral Component Interconnect Express (PCIe) interface device and plural storage devices may include identifying, by the PCIe interface device, a total capacity of each of the storage devices, reference numbers designate like elements.

FIG. 1 is a block diagram illustrating a Peripheral Component Interconnect Express (PCIe) interface device 100 according to an embodiment of the present disclosure.

Referring to FIG. 1, the PCIe interface device 100 may include a central processing unit (CPU) 110, a root complex 120, memory 130, a switch 140, PCIe endpoints 150_1, 150_2, and 1503, legacy endpoints 160_1 and 1602, and a PCIe to PCI/PCI-X bridge 170.

In an embodiment shown in FIG. 1, the root complex 120 may be coupled to each of the switch 140, the PCIe endpoint 1503, and the PCIe to PCI/PCI-X bridge 170 through respective links LINK. In addition, the switch 140 may be coupled to each of the PCIe endpoints 150_1 and 150_2 and the legacy endpoints 160_1 and 160_2 through respective links LINK. The link LINK may include at least one lane.

According to an embodiment, the root complex 120 may couple the CPU 110 and the memory 130 to an input/output (I/O) hierarchy.

More specifically, the root complex 120 may support a PCIe port. In other words, the root complex 120 may support a root port that could be coupled to an input/output (I/O) device.

In addition, the root complex 120 may support routing between layers of respective components included in the PCIe shown, the RAID controller 180 may be disposed external to the root complex 120 and may be coupled to the CPU 110 and the memory 130.

Methods of RAID-coupling a plurality of storage devices may include a hardware-wise method and a software-wise method.

More specifically, the hardware-wise method may include a method in which the RAID controller 180 is included in the PCIe interface device 100. The RAID controller 180 may control the plurality of storage devices coupled by the links to operate as a single logical storage device. The software-wise method may be implemented using a RAID function of an operating system, and may show a user the plurality of storage devices as if the plurality of storage devices are a single storage device.

According to an embodiment, the switch 140 may include two or more logical PCI-to-PCI bridges. Each of the two or more logical PCI-to-PCI bridges may be coupled to an upstream port or a downstream port.

The switch 140 may transmit a transaction using a PCI bridge mechanism, i.e., an address-based multicasting method. The switch 140 must be able to transmit all types of transaction layer packets (TLPs) through an upstream port and a downstream port. In addition, the switch 140 must support a locked request. Each port of the enabled switch 140 must be able to support flow control. When contention occurs in the same virtual channel, the switch 140 may arbitrate the contention by applying a round robin scheme or a weighted round robin scheme.

According to an embodiment, unlike the root complex 120, the switch 140 might not divide a packet transmitted between layers into smaller units.

According to an embodiment, the PCIe endpoints 150_1, 1502, and 150_3 and the legacy endpoints 160_1 and 160_2 may serve as a requester or a completer of a PCIe transaction. A TLP transmitted and received by the PCIe endpoints 150_1, 150_2, and 150_3 and the legacy endpoints 160_1 and 160_2 must provide a configuration space header. In addition, the PCIe endpoints 150_1, 150_2, and 150_3 and the legacy endpoints 160_1 and 160_2 must provide a configuration request as the completer.

According to an embodiment, the PCIe endpoints 150_1, 1502, and 150_3 and the legacy endpoints 160_1 and 160_2 may be classified according to a size of a memory transaction. For example, the PCIe endpoints 150_1, 150_2, and 150_3 may handle a memory transaction exceeding 4 GB and the legacy endpoints 160_1 and 160_2 may handle a memory transaction under 4 GB. The PCIe endpoints 150_1, 150_2, and 150_3 must not generate an input/output (I/O) request, whereas the legacy endpoints 160_1 and 160_2 may provide or generate an I/O request.

According to an embodiment, the PCIe endpoint 150_3 may transmit or receive a TLP to or from the root complex 120. In addition, Peripheral Component Interconnect/Peripheral Component Interconnect eXtended (PCI/PCI-X) may transmit or receive a TLP to or from the root complex 120 through the PCIe to PCI/PCI-X bridge 170. The PCIe endpoints 150_1 and 150_2 or the legacy endpoints 160_1 and 160_2 may transmit or receive a TLP to or from the switch 140.

According to an embodiment, the switch 140 may transmit the TLP received from the PCIe endpoints 150_1 and 150_2 or the legacy endpoints 160_1 and 160_2 to the root complex 120. The switch 140 may transfer the TLP received from the root complex 120 to the PCIe endpoint 150_3 or the PCI/PCI-X.

According to an embodiment, the root complex 120 may directly transmit or receive a TLP to or from the PCIe endpoint 150_3. The root complex 120 may transmit or receive a TLP to or from the PCIe endpoints 150_1 and 150_2 or the legacy endpoints 160_1 and 160_2 through the switch 140. According to an embodiment, the root complex 120 may transmit the TLP received from the PCIe endpoints 150_1, 150_2, and 150_3 or the legacy endpoints 160_1 and 160_2 to the CPU 110 or the memory 130.

Figure 2:
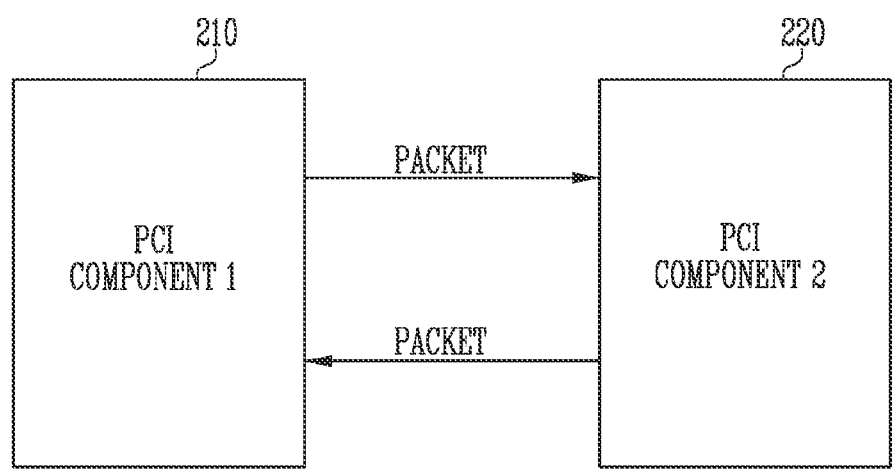

FIG. 2 is a diagram illustrating transmission of packets between components included in the PCIe interface device 100 according to an embodiment of the present disclosure.

Referring to FIGS. 1 and 2, each of PCI components 210 and 220 may be one of the root complex 120, the switch 140, the PCIe endpoints 150_1, 150_2, and 1503, the legacy endpoints 160_1 and 160_2, and the PCIe to PCI/PCI-X bridge 170 shown in FIG. 1. In other words, each of the PCI components 210 and 220 shown in FIG. 2 may be one of the components coupled by the links LINK. The link LINK may include at least one lane.

According to an embodiment, the PCI components 210 and 220 may transmit or receive a packet PACKET through the link LINK. In other words, each of the PCI components 210 and 220 may serve as a transmitter TX transmitting the packet PACKET or a receiver RX receiving the packet PACKET.

According to an embodiment, the packet PACKET may be a unit of information transmission and may include an optional TLP prefix, header, and data payload.

According to an embodiment, latency may be reduced by not snooping the packet PACKET that needs not to be cached. When transaction dependencies do not arise, packet PACKET operational performance may be improved by changing ordering. In addition, the packet PACKET operational performance may also be improved by changing ordering based on ID.

Figure 3:
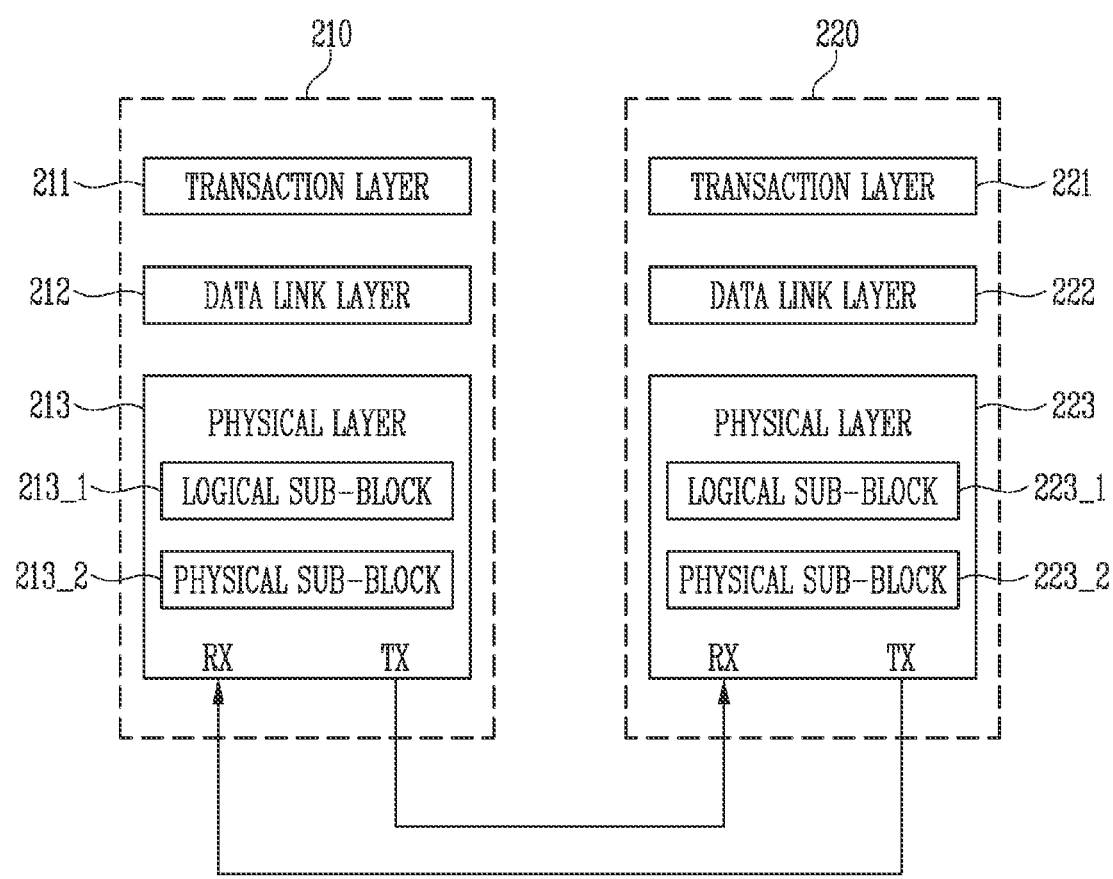

FIG. 3 is a diagram illustrating layers included in each of components included in the PCIe interface device 100 according to an embodiment of the present disclosure.

Referring to FIGS. 2 and 3, FIG. 3 illustrates layers included in each of the PCI components 210 and 220 shown in FIG. 2. In FIG. 3, each of the PCI components 210 and 220 may include a transaction layer 211, 221, a data link layer 212, 222, and a physical layer 213, 223. The physical layer 213, 223 may include a logical sub-block 213_1, 223_1 and a physical sub-block 213_2, 223_2.

According to an embodiment, the transaction layer 211, 221 may combine or decompose a transaction layer packet (TLP). The TLP may be used for processing a transaction of read or write, that is, a particular event.

The transaction layer 211, 221 may control a credit-based flow. In addition, the transaction layer 211, 221 may support various formats of addressing depending on a transaction type. For example, the transaction layer 211, 221 may support addressing with respect to memory, input/output, configuration, or a message.

According to an embodiment, the transaction layer 211, 221 may perform a function of initialization and configuration. More specifically, the transaction layer 211, 221 may store link setting information generated by a processor or a management device. In addition, the transaction layer 211, 221 may store link attributes related to a bandwidth and a frequency determined by the physical layer 213, 223.

According to an embodiment, the transaction layer 211, 221 may generate and process a packet. More specifically, the transaction layer 211, 221 may generate a TLP requested by a device core and may translate a received TLP into data payload or status information. In addition, when the transaction layer 211, 221 supports End-to-End data integrity, the transaction layer 211, 221 may generate and update a cyclic redundancy check (CRC) code to a header of the TLP.

According to an embodiment, the transaction layer 211, 221 may control a flow. More specifically, the transaction layer 211, 221 may track flow control credit with respect to a TLP in the link. In addition, the transaction layer 211, 221 may periodically receive a state of transaction credit through the data link layer 212, 222. The transaction layer 211, 221 may control TLP transmission based on flow control information.

According to an embodiment, the transaction layer 211, 221 may manage power. More specifically, the transaction layer 211, 221 may manage power according to instructions of system software. In addition, the transaction layer 211, 221 may autonomously manage power according to instructions of hardware when power is supplied.

According to an embodiment, the transaction layer 211, 221 may identify a virtual channel mechanism and a traffic class for a particular class of an application. The transaction layer 211, 221 may provide an independent logical data flow through a particular physical resource. In addition, the transaction layer 211, 221 may apply an appropriate service policy in a manner of providing different ordering through packet labelling.

According to an embodiment, the data link layer 212, 222 may take charge of link management, data integrity, error detection, and error correction. The data link layer 212, 222 may assign a data protection code and a TLP sequence number to a TLP to be transmitted and transmit the TLP to the physical layer 213, 223. In addition, the data link layer 212, 222 may check integrity of a TLP received from the physical layer 213, 223 and transmit the integrity of the TLP to the transaction layer 211, 221.

When the data link layer 212, 222 detects an error in a TLP, the data link layer 212, 222 may request retransmission of a TLP from the physical layer 213, 223 until a TLP without an error is received or it is determined that a link is in a fail state. The data link layer 212, 222 may generate and consume a data link layer packet (DLLP) used for link management.

According to an embodiment, the data link layer 212, 222 may exchange reliable information. In addition, the data link layer 212, 222 may manage initialization and power. More specifically, the data link layer 212, 222 may transmit a power status request from the transaction layer 211, 221 to the physical layer 213, 223. In addition, the data link layer 212, 222 may transmit information on activation or inactivation, reset, disconnection, and power management status to the transaction layer 211, 221.

According to an embodiment, the data link layer 212, 222 may perform data protection, an error check, and a retry. More specifically, the data link layer 212, 222 may generate a CRC code for data protection. In addition, the data link layer 212, 222 may store a TLP such that a retry may be performed with respect to a transmitted TLP. The data link layer 212, 222 may check a TLP, transmit a retry message, and indicate an error for an error report and logging.

According to an embodiment, the physical layer 213, 223 may include components for an interface operation, such as a driver, an input buffer, a parallel-to-serial or serial-to-parallel convertor, and/or a phase-locked loop (PLL).

According to an embodiment, the physical layer 213, 223 may convert a packet received from the data link layer 212, 222 into a serialized format and transmit the converted packet. In addition, the physical layer 213, 223 may set a bandwidth and a frequency according to compatibility with a device coupled to an end of a link opposite to an end to which the physical layer 213, 223 is coupled. For serial communication of data, the physical layer 213, 223 may serialize or deserialize a packet. In other words, the physical layer 213, 223 may serve as a serializer or a deserializer.

According to an embodiment, the physical layer 213, 223 may perform initialization, maintenance, and status detection of an interface. More specifically, the physical layer 213, 223 may manage power due to coupling among the components. In addition, the physical layer 213, 223 may negotiate bandwidths and lane mapping among the components, and may reverse polarity of a lane.

The physical layer 213, 223 may generate a symbol and a special ordered set. In addition, the physical layer 213, 223 may transmit and align the generated symbol.

According to an embodiment, the physical layer 213, 223 may serve as a transmitter or a receiver of a packet between PCI components. In other words, the physical layer 213, 223 may convert a packet received through the transaction layer 211, 221 and the data link layer 212, 222 to transmit the converted packet to PCI components other than a PCI component in which the physical layer 213, 223 is included, and convert a packet received from the PCI components other than the PCI component in which the physical layer 213, 223 is included to transmit the converted packet to the transaction layer 211, 221 through the data link layer 212, 222.

According to an embodiment, the logical sub-block 213_1, 223_1 included in the physical layer 213, 223 may have two sections. One of the two sections may be a transmission section which prepares transmission of information transmitted from the data link layer 212, 222 to the physical sub-block 213_2, 223_2. The other of the two sections may be a reception section which identifies information and prepares output of the information to the data link layer 212, 222 before outputting the information to the data link layer 212, 222.

According to an embodiment, the physical sub-blocks 213_2 and 223_2 included in the physical layers 213 and 223, respectively, may be electrical sub-blocks which are able to support an independent reference clock structure in common or independently. In addition, the physical sub-block 213_2, 223_2 may reduce a swing for a low-power link operation, detect a receiver within a band, and detect an electrical idle state.

Figure 4:
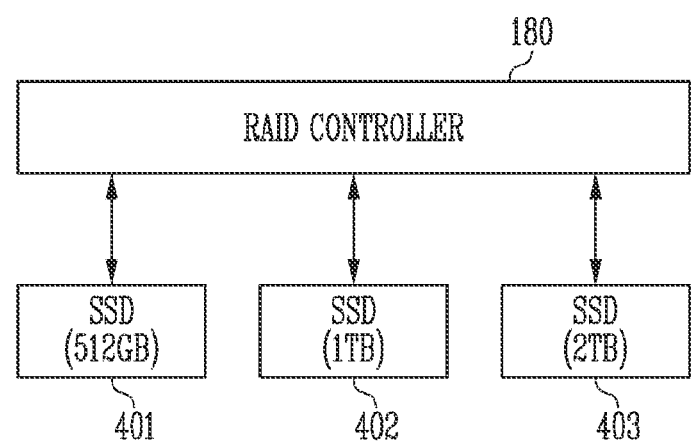

FIG. 4 is a diagram illustrating coupling of a plurality of solid-state drives (SSDs) having different capacities according to an embodiment of the present disclosure.

Referring to FIGS. 1 and 4, FIG. 4 illustrates a plurality of storage devices 401, 402, and 403 coupled to the RAID controller 180 through the links LINK shown in FIG. 1. Each of the plurality of storage devices 401, 402, and 403 may be a solid-state drive (SSD) or a hard disk drive (HDD). By way of example, all of the plurality of storage devices 401, 402, and 403 shown in FIG. 4 are solid-state drives (SSDs) in the context of the following description.

According to an embodiment shown in FIG. 4, the number of the plurality of storage devices 401, 402, and 403 coupled to the RAID controller 180 is three in total, and capacities of the plurality of storage devices 401, 402, and 403 may be 512 GB, 1 TB, and 2 TB, respectively. According to another embodiment, less or more than three storage devices may be coupled to the RAID controller 180. In addition, capacities of the storage devices coupled to the RAID controller 180 may be the same or different.

According to an embodiment, when the capacities of the plurality of storage devices 401, 402, and 403 are different, the plurality of storage devices 401, 402, and 403 may be RAID-coupled together. When the plurality of storage devices 401, 402, and 403 having different capacities are RAID-coupled together, an available capacity of each of the plurality of storage devices 401, 402, and 403 may depend on the smallest capacity among the capacities of the plurality of storage devices 401, 402, and 403.

For example, the capacity of the storage device (SSD) 401 which is the smallest among the capacities of the plurality of storage devices 401, 402, and 403 may be 512 GB. The available capacities of the plurality of storage devices 401, 402, and 403 may depend on the capacity of the storage device (SSD) 401 which is the smallest capacity. Accordingly, although the capacity of the storage device (SSD) 402 is 1 TB and the capacity of the storage device (SSD) 403 is 2 TB, only the capacity of 512 GB may be available in each of the storage devices (SSDs) 402 and 403.

As a result, the available capacity of each of the storage devices (SSDs) 402 and 403 depends on the capacity of the storage device (SSD) 401, and therefore a remaining capacity of each of the storage devices (SSDs) 402 and 403 except for the available capacity might not be utilized during the RAID-coupling.

Further, when the plurality of storage devices 401, 402, and 403 having different capacities are RAID-coupled together, operating speeds of the plurality of storage devices 401, 402, and 403 may depend on the lowest operating speed among the operating speeds of the plurality of storage devices 401, 402, and 403. Generally, an operating speed of a storage device having the smallest capacity is the lowest, and therefore the operating speeds of the plurality of storage devices 401, 402, and 403 may depend on the operating speed of the storage device having the smallest capacity.

Accordingly, in order to prevent or mitigate the available capacities and the operating speeds of the plurality of storage devices 401, 402, and 403 from depending on the capacity and the operating speed of the storage device having the smallest capacity, the present disclosure provides a method of RAID-coupling the plurality of storage devices 401, 402, and 403 having different capacities by allocating capacities to respective functions of the plurality of storage devices 401, 402, and 403 based on the greatest common divisor of the capacities of the plurality of storage devices 401, 402, and 403. The function may refer to a physical function (PF) among the physical function (PF) and a virtual function (VF). The PF and the VF are functions supported by the PCIe interface device 100, the PF means a physical device, and a plurality of virtual devices may be generated per PF. Accordingly, a plurality of VFs may be generated to each PF, and respective PFs may support different numbers of VFs.

Further, according to the present disclosure, an unavailable capacity of each of storage devices having different capacities may be minimized while using conventional RAID-coupling methods (i.e., the conventional RAID schemes RAID 0 to 6).

Figure 5:
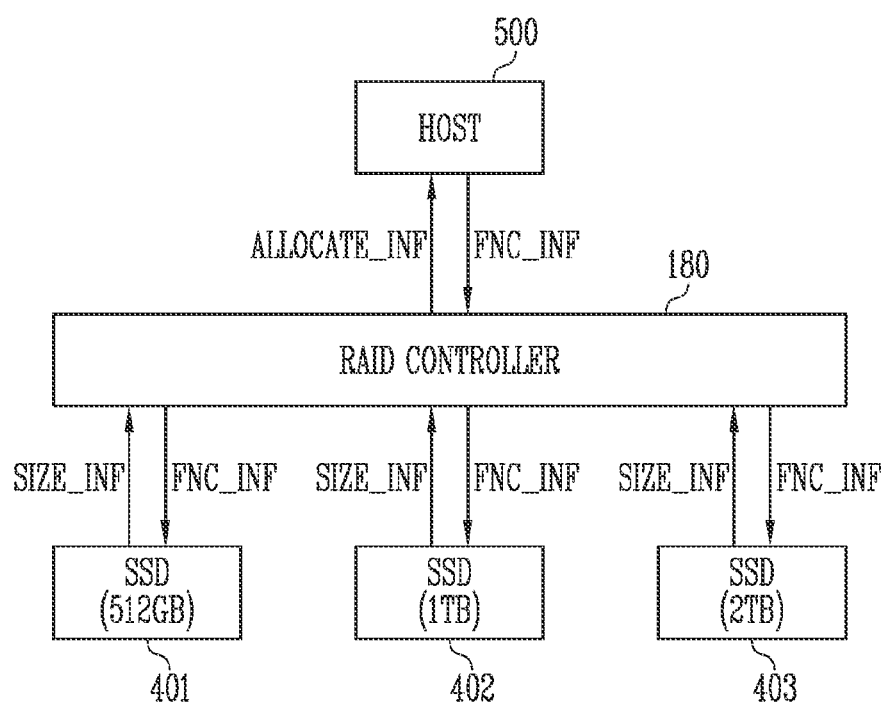

FIG. 5 is a diagram illustrating a process of allocating capacities to respective functions when a plurality of SSDs having different capacities are coupled according to an embodiment of the present disclosure.

Referring to FIGS. 4 and 5, FIG. 5 illustrates an initialization operation for RAID-coupling the plurality of storage devices 401, 402, and 403 having different capacities. By way of example, the plurality of storage devices 401, 402, and 403 shown in FIG. 5 are the same as the plurality of storage devices 401, 402, and 403 shown in FIG. 4 in the context of the following description.

According to an embodiment described with reference to FIG. 5, a method in which the RAID controller 180 allocates capacities to respective functions allocated to each of the storage devices 401 to 403 based on size information SIZE_INF received from each storage device, that is, the hardware-wise method is described. However, according to another embodiment, the present disclosure may be applied in a manner of allocating capacities to respective functions using a RAID function of an operating system, that is, the software-wise method.

According to an embodiment, before the plurality of storage devices 401, 402, and 403 are RAID-coupled together, entire data of the plurality of storage devices 401, 402, and 403 may be deleted.

When the entire data of the plurality of storage devices 401, 402, and 403 is deleted, the RAID controller 180 may receive, from the storage devices 401 to 403, the size information SIZE_INF of each of the plurality of storage devices 401, 402, and 403 to be RAID-coupled together. Accordingly, the RAID controller 180 may identify a capacity of the storage device (SSD) 401 as 512 GB, a capacity of the storage device (SSD) 402 as 1 TB, and a capacity of the storage device (SSD) 403 as 2 TB based on the size information SIZE_INF.

According to an embodiment, after the RAID controller 180 identifies the capacities of each of the plurality of storage devices 401, 402, and 403, the RAID controller 180 may provide a host 500 with allocation information ALLOCATE_INF representing a number of functions to be allocated to each of the storage devices 401 to 403. Capacities may be allocated to respective functions allocated to each of the plurality of storage devices 401, 402, and 403 based on the greatest common divisor of the capacities of the plurality of storage devices 401, 402, and 403. The greatest common divisor of the capacities of the plurality of storage devices 401, 402, and 403 may be a reference capacity.

More specifically, because the capacities of the plurality of storage devices 401, 402, and 403 are 512 GB, 1 TB, and 2 TB, respectively, the reference capacity may be 512 GB. Accordingly, the RAID controller 180 may determine a number of functions to be allocated to each storage device based on a capacity of 512 GB per function. For example, the RAID controller 180 may determine a single function to be allocated to the storage device (SSD) 401, two functions to be allocated to the storage device (SSD) 402, and four functions to be allocated to the storage device (SSD) 403. The RAID controller 180 may output, to the host 500, the allocation information ALLOCATE_INF representing the determined number of functions to be allocated to each storage device.

The host 500 may generate, based on the allocation information ALLOCATE_INF received from the RAID controller 180, function information FNC_INF for allocating the determined number of functions to each of the storage devices. The host 500 may provide the function information FNC_INF to the storage devices 401 to 403 through the RAID controller 180 by a predetermined method (for example, a management component transport protocol (MCTP), a vendor specific method, or an NVMe admin command).

More specifically, the host 500 may allocate the determined number of functions to each of the storage devices 401 to 403. The determined number of functions may be provided to the host 500 through the allocation information ALLOCATE_INF. The determined number of functions may be based on the reference capacity of 512 GB. Accordingly, each of the plurality of storage devices 401, 402, and 403 may divide its capacity into one or more units of the reference capacity according to the number of functions allocated thereto through the function information FNC_INF. Each of the storage devices 401 to 403 may allocate the divided units of the reference capacity to the respective functions allocated thereto.

Thereafter, the PCIe interface device may be rebooted. However, when the plurality of storage devices 401, 402, and 403 are not solid-state drives (SSD), the PCIe interface device might not be rebooted.

According to an embodiment, when any storage device that does not support the predetermined method (hereinafter, referred to as a "non-supporting storage device") exist among the plurality of storage devices 401, 402, and 403, the host 500 may allocate a number of functions to each of the plurality of storage devices 401, 402, and 403 based on a capacity of the non-supporting storage device without dividing the capacity of the non-supporting storage device.

A method of allocating the number of functions to storage devices when the non-supporting storage device exists is described in detail below with reference to FIGS. 8 and 9.

Figure 6:
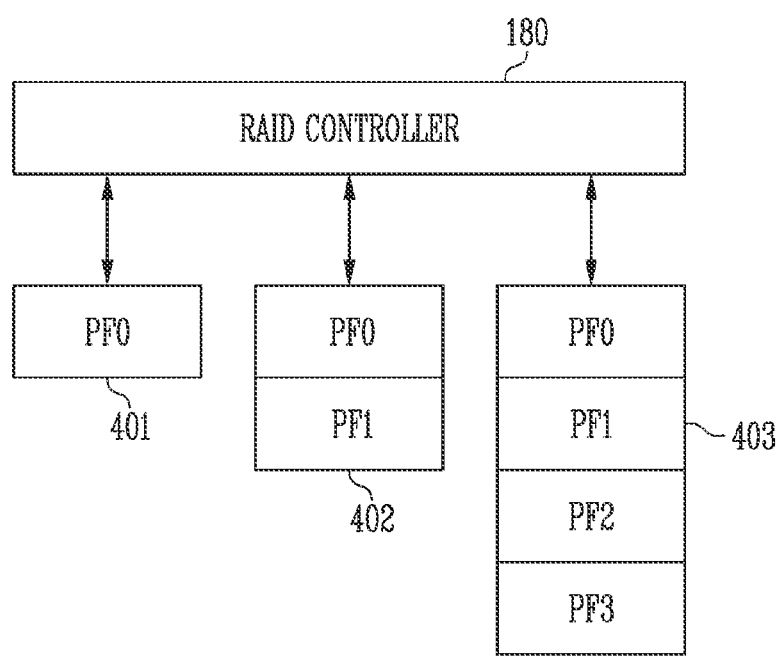

FIG. 6 is a diagram illustrating a method of dividing capacities of SSDs per function according to an embodiment of the present disclosure.

Referring to FIGS. 5 and 6, FIG. 6 illustrates a capacity allocated to each function after each storage device receives the function information FNC_INF from the host 500 as in the embodiment described with reference to FIG. 5.

According to an embodiment, the RAID controller 180 may determine one function to be allocated to the storage device (SSD) 401, two functions to be allocated to the storage device (SSD) 402, and four functions to be allocated to the storage device (SSD) 403 according to the reference capacity.

Accordingly, a single unit of the reference capacity is allocated to one function (PF0) allocated to the storage device (SSD) 401, and the single unit of the reference capacity for the function PF0 may be 512 GB. A capacity of two units of the reference capacity is allocated to two functions (PF0 and PF1) allocated to the storage device (SSD) 402, and the reference capacity for each of the two functions PF0 and the PF1 may be 512 GB. A capacity of four units of the reference capacity is allocated to four functions (PF0, PF1, PF2, and PF3) allocated to the storage device (SSD) 403, and the single unit of the reference capacity for each of the PF0, PF1, PF2, and PF3 may be 512 GB.

As a result, because the reference capacity of 512 GB is allocated to each function allocated to each of the plurality of storage devices 401, 402, and 403, the reference capacity for each of the PF0, PF1, PF2, and PF3 may be 512 GB. In addition, the number of functions may be allocated to each of the plurality of storage devices 401, 402, and 403 in response to the function information FNC_INF. The function information FNC_INF may be determined according to the allocation information ALLOCATE_INF. The allocation information ALLOCATE_INF may be determined according to the reference capacity.

When a capacity is allocated to each function in the plurality of storage devices 401, 402, and 403 in the above-described manner, the plurality of storage devices 401, 402, and 403 having different capacities may be utilized in their entirety. In other words, the plurality of storage devices 401, 402, and 403 having different capacities may be RAID-coupled without depending on a storage device having the smallest capacity among the plurality of storage devices 401, 402, and 403.

Figure 7:
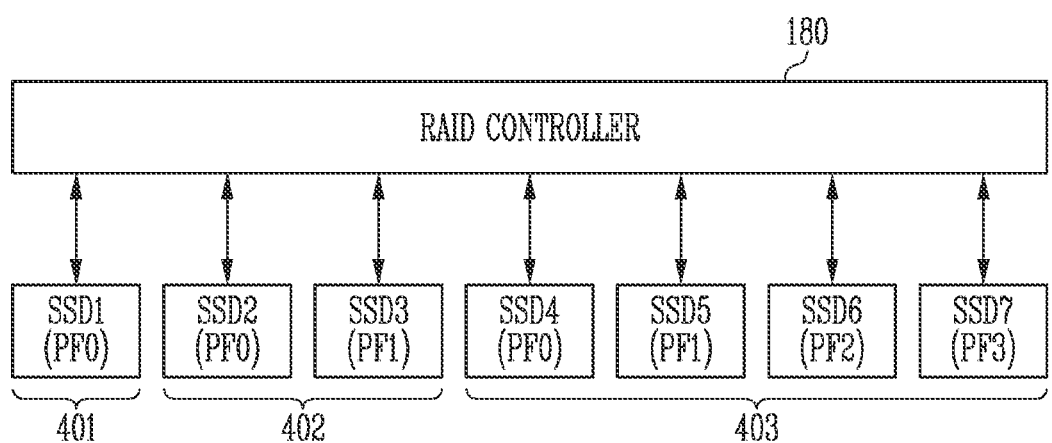

FIG. 7 is a diagram illustrating a RAID operation after allocating capacities to respective functions as shown in FIG. 6 according to an embodiment of the present disclosure.

Referring to FIGS. 6 and 7, FIG. 7 illustrates a RAID operation after the reference capacity of 512 GB is allocated to each function in the plurality of storage devices 401, 402, and 403 as in the embodiment described with reference to FIG. 6.

According to an embodiment, when the reference capacity is allocated to each function allocated to each of the plurality of storage devices 401, 402, and 403, the RAID controller 180 or the CPU 110 shown in FIG. 1 may recognize each function as one storage device. In other words, the RAID controller 180 or the CPU 110 shown in FIG. 1 may detect and RAID-couple the functions having the same capacity.

Accordingly, the RAID controller 180 may recognize the function PF0 of the storage device (SSD) 401 as a first storage device (SSD1), the function PF0 and the function PF1 of the storage device (SSD) 402 as a second storage device (SSD2) and a third storage device (SSD3), respectively, and the function PF0, the function PF1, the function PF2, and the function PF3 of the storage device (SSD) 403 as a fourth storage device (SSD4), a fifth storage device (SSD5), a sixth storage device (SSD6), and a seventh storage device (SSD7), respectively, and may RAID-couple the first to seventh storage devices (SSD1 to SSD7).

In addition, when the first to seventh storage devices (SSD1 to SSD7) are RAID-coupled, the first to seventh storage devices (SSD1 to SSD7), to each of which the reference capacity is allocated may be maintained until the RAID-coupling is initialized, even when power is not supplied.

Figure 8:
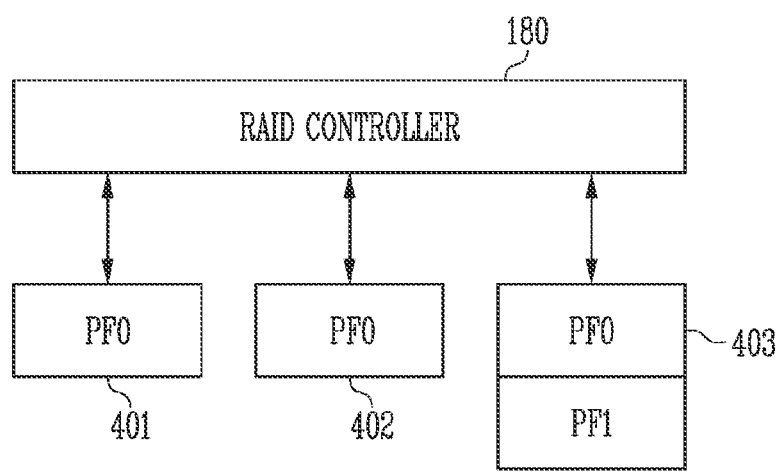

FIG. 8 is a diagram illustrating a method of allocating capacities to respective functions when the non-supporting storage device is coupled according to an embodiment of the present disclosure.

Referring to FIGS. 5 and 8, FIG. 8 illustrates a method of allocating capacities to respective functions when the host 500 outputs, by a predetermined method as in the embodiment shown in FIG. 5, the function information FNC_INF allocating the determined number of functions to each of the storage devices 401 to 403 but a storage device does not support the predetermined method, that is, a predetermined protocol among the storage devices 401 to 403.

By way of example, in an embodiment shown in FIG. 8, the non-supporting storage device that does not support a predetermined protocol is the storage device (SSD) 402 in the context of the following description.

According to an embodiment, when the storage device (SSD) 402 is the non-supporting storage device that does not support the predetermined protocol, capacities may be allocated to respective functions not based on the greatest common divisor of the capacities of the plurality of storage devices 401, 402, and 403 but based on the capacity of the storage device (SSD) 402.

For example, because the capacity of the storage device (SSD) 402 that does not support the predetermined protocol is 1 TB, the RAID controller 180 may set the reference capacity to 1 TB. Accordingly, because the capacity of the storage device (SSD) 401 is 512 GB, which is less than the reference capacity of 1 TB, the RAID controller 180 may determine one function (PF0) to be allocated to the storage device (SSD) 401. Because the capacity of the storage device (SSD) 402 is the reference capacity, the RAID controller 180 may determine one function (PF0) to be allocated to the storage device (SSD) 402. In addition, the RAID controller 180 may determine two functions (PF0 and PF1) to be allocated to the storage device (SSD) 403.

Accordingly, a single unit of the reference capacity is allocated to one function (PF0) allocated to the storage device (SSD) 401, and the single unit of the reference capacity for the function PF0 may be 512 GB. In addition, a single unit of the reference capacity is allocated to one function (PF0) allocated to the storage device (SSD) 402, and the single unit of the reference capacity for the function PF0 may be 1 TB. A capacity of two units of the reference capacity is allocated to two functions (PF0 and PF1) allocated to the storage device (SSD) 403, and the reference capacity for each of the two functions PF0 and the PF1 may be 1 TB.

As a result, when the storage device (SSD) 402 is the non-supporting storage device that does not support the predetermined protocol, the reference capacity of 1 TB is allocated to each function allocated to each of the plurality of storage devices 401, 402, and 403. Accordingly, the capacity of the function PF0 in the storage device (SSD) 401 may be 512 GB, whereas the capacity of each of the function PF0 and the function PF1 in the storage device (SSD) 402 or the storage device (SSD) 403 may be 1 TB. In addition, the number of functions to be allocated to each of the plurality of storage devices 401, 402, and 403 may be determined according to the reference capacity.

When a capacity is allocated to each function in the plurality of storage devices 401, 402, and 403 in the above-described manner, the plurality of storage devices 401, 402, and 403 having different capacities may be utilized in their entirety even when the storage device (SSD) 402 does not support the predetermined protocol. In other words, the plurality of storage devices 401, 402, and 403 having different capacities may be RAID-coupled without depending on a storage device having the smallest capacity among the plurality of storage devices 401, 402, and 403.

Figure 9:
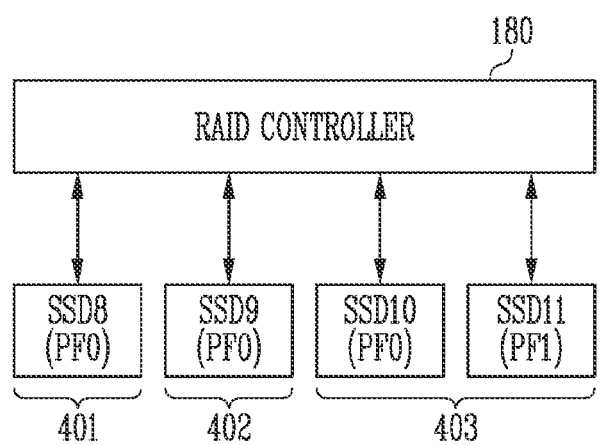

FIG. 9 is a diagram illustrating a RAID operation after allocating capacities to respective functions as shown in FIG. 8 according to an embodiment of the present disclosure.

Referring to FIGS. 8 and 9, FIG. 9 illustrates a RAID operation after the reference capacity of 1 TB is allocated to each function in the plurality of storage devices 401, 402, and 403 as in the embodiment described with reference to FIG. 8.

According to an embodiment, when the reference capacity is allocated to each function allocated to each of the plurality of storage devices 401, 402, and 403, the RAID controller 180 or the CPU 110 shown in FIG. 1 may recognize each function as one storage device. In other words, the RAID controller 180 or the CPU 110 shown in FIG. 1 may detect and RAID-couple the functions having the same capacity.

Accordingly, the RAID controller 180 may recognize the function PF0 of the storage device (SSD) 401 as an eighth storage device (SSD8), the function PF0 of the storage device (SSD) 402 as a ninth storage device (SSD9), and the function PF0 and the function PF1 of the storage device (SSD) 403 as a tenth storage device (SSD10) and an eleventh storage device (SSD11), respectively, and may RAID-couple the eighth to eleventh storage devices (SSD8 to SSD11).

In addition, when the eighth to eleventh storage devices (SSD8 to SSD11) are RAID-coupled, the eighth to eleventh storage devices (SSD8 to SSD11), to each of which the reference capacity is allocated may be maintained until the RAID-coupling is initialized, even when power is not supplied.

Figure 10:
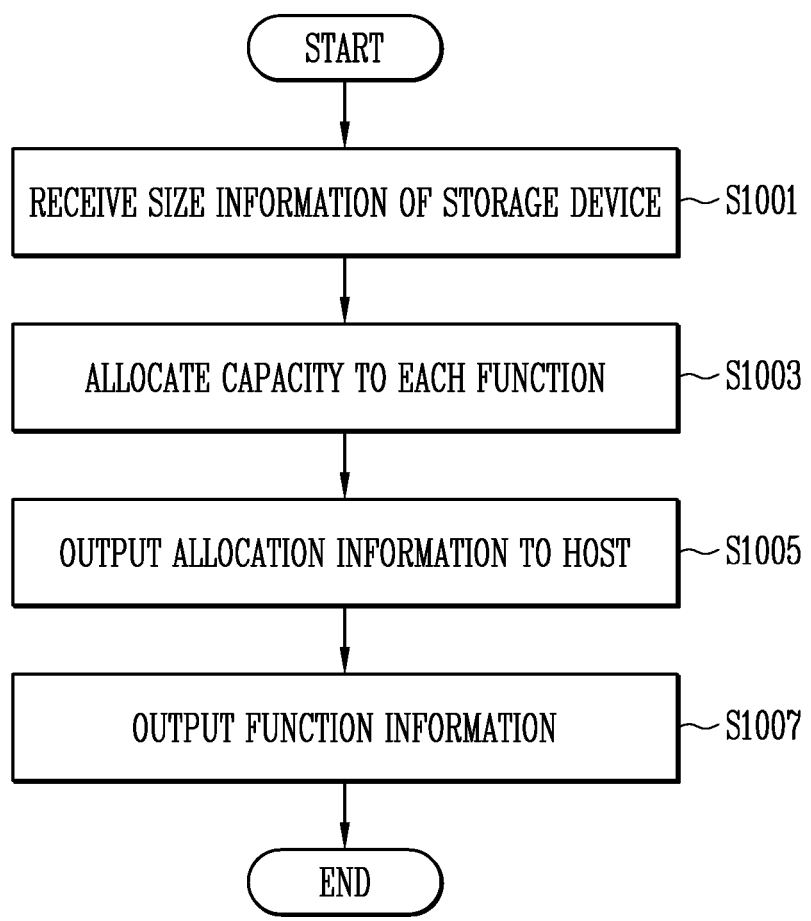

FIG. 10 is a diagram illustrating an operation of a PCIe interface device according to an embodiment of the present disclosure.

Referring to FIG. 10, at operation S1001, a PCIe interface device may receive size information from each of a plurality of storage devices respectively coupled to PCIe endpoints or legacy endpoints. Each of the plurality of storage devices may be a solid-state drive (SSD) device or a hard drive (HDD) device. The size information of each of the plurality of storage devices indicates a capacity of each of the plurality of storage devices and the capacities of the plurality of storage devices may be different.

At operation S1003, the PCIe interface device may determine a number of functions to be allocated to each of the plurality of storage devices. More specifically, the PCIe interface device may identify the capacities of the respective storage devices based on the size information, and may then determine the number of functions to be allocated to each of the storage devices based on the greatest common divisor of the capacities of the plurality of storage devices. The capacity corresponding to the greatest common divisor may be a reference capacity. Accordingly, the PCIe interface device may determine the number of functions allocated to each storage device based on a reference capacity per function.

At operation S1005, the PCIe interface device may output allocation information to a host. The allocation information may represent the number of functions to be allocated to each storage device according to the reference capacity.

At operation S1007, the PCIe interface device may transfer function information received from the host to each storage device. Each storage device may divide its capacity into one or more units of the reference capacity according to the number of functions allocated thereto through the function information. Each of the storage devices may allocate the divided units of the reference capacity to the respective functions allocated thereto.

When one or more units of the reference capacity are allocated to each function allocated to the plurality of storage devices, the PCIe interface device may recognize each function as one storage device. In other words, the PCIe interface device may detect and RAID-couple the storage devices having the same capacity.

Figure 11:
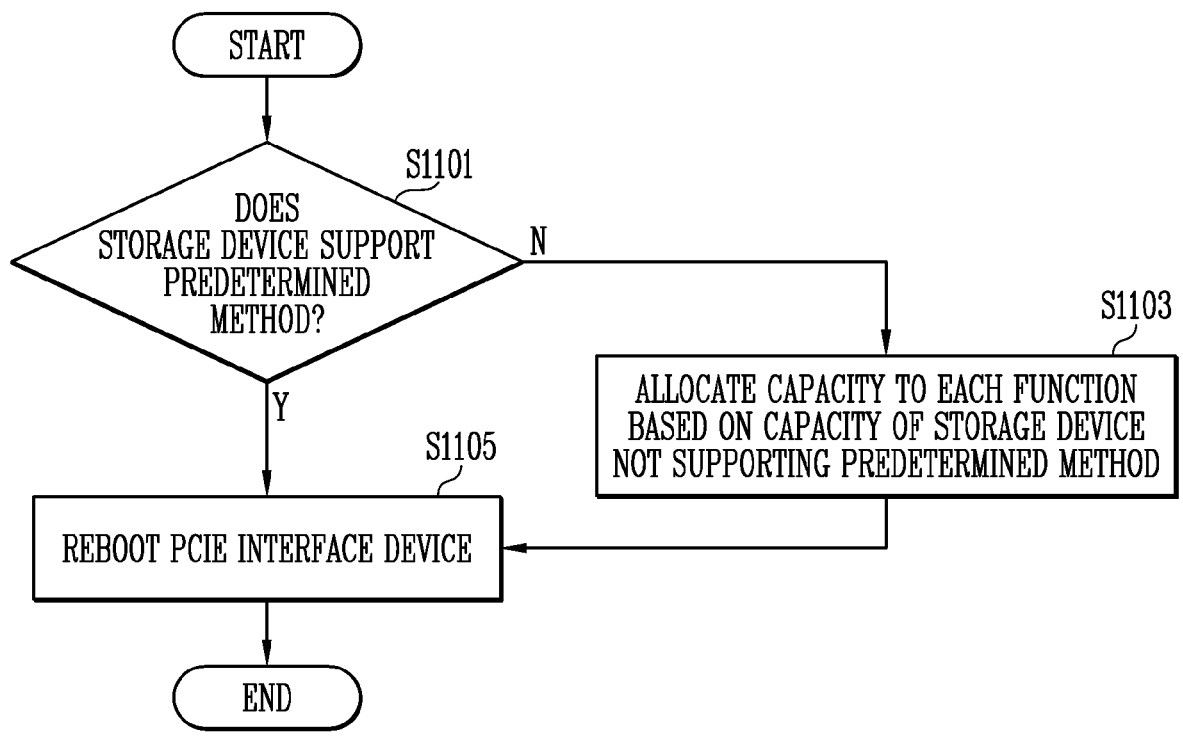

FIG. 11 is a diagram illustrating an operation of a PCIe interface device according to an embodiment of the present disclosure.

Referring to FIGS. 10 and 11, FIG. 11 illustrates operations subsequent to operation S1007 shown in FIG. 10 according to an embodiment of the present disclosure.

At operation S1101, the PCIe interface device may determine whether each storage device supports a predetermined method.

According to an embodiment, the host may output function information allocating the number of functions to each of the storage devices through the PCIe interface device by the predetermined method. However, the storage devices may support or might not support the predetermined method, that is, a predetermined protocol. Accordingly, the PCIe interface device may determine whether each storage device supports the predetermined protocol.

When a storage device does not support the predetermined method (a result of operation S1101 is No (N)), the process flow may proceed to operation S1103. When a storage device supports the predetermined method (a result of operation S1101 is Yes (Y)), the process flow may proceed to operation S1105.

At operation S1103, the PCIe interface device may allocate a capacity to each function based on a capacity of the storage device that does not support the predetermined method. In other words, the PCIe interface device may set, as a reference capacity, the capacity of the storage device that does not support the predetermined protocol, but not the greatest common divisor of the capacities of the plurality of storage devices and may allocate the reference capacity to each function based on the capacity of the storage device that does not support the predetermined protocol. When the capacity is allocated to each function based on the capacity of the storage device that does not support the predetermined protocol, the process flow may proceed to operation S1105.

At operation S1105, when the storage device supports the predetermined method or when the capacity is allocated to each function based on the capacity of the storage device that does not support the predetermined method, the PCIe interface device may be rebooted. Thereafter, the functions to each of which the reference capacity is allocated may be maintained until the RAID-coupling is initialized, even when power is not supplied.

In an embodiment, when the storage devices are not solid-state drives (SSDs), operation S1105 may be omitted.

According to embodiments of the present disclosure, a PCIe interface device capable of RAID-coupling SSDs having different capacities and a method of operating the PCIe interface device may be provided.

While various embodiments have been described above, it will be understood by those skilled in the art that the embodiments described are examples only. Accordingly, the Peripheral Component Interconnect Express (PCIe) interface device and the operating method thereof described herein should not be limited based on the described embodiments. It will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A Peripheral Component Interconnect Express (PCIe) interface device, comprising:

a root complex configured to support a PCIe port;
a plurality of endpoints each coupled to the root complex through a link; and
a Redundant Array of Independent Disks (RAID) controller configured to control RAID-coupling of a plurality of storage devices that are respectively coupled to the plurality of endpoints,
wherein the RAID controller is further configured to request a host to allocate a number of functions to be executed in the plurality of storage devices based on a storage capacity of each of the plurality of storage devices and a reference capacity.

2. The PCIe interface device of claim 1, wherein each of the plurality of storage devices is a solid-state drive (SSD) device or a hard disk drive (HDD) device.

3. The PCIe interface device of claim 2, wherein the RAID controller is further configured to omit rebooting the HDD device among the plurality of storage devices after the RAID-coupling.

4. The PCIe interface device of claim 1, wherein the RAID controller is further configured to:
receive, from the plurality of storage devices, pieces of size information indicating storage capacities of the respective storage devices, and
set, as the reference capacity, a greatest common divisor of the storage capacities of the plurality of storage devices based on the received pieces of size information.

5. The PCIe interface device of claim 1, wherein the RAID controller is further configured to determine the number of functions to be allocated to each of the plurality of storage devices based on the reference capacity.

6. The PCIe interface device of claim 5, wherein the RAID controller RAID-couples functions, divided according to the number of functions allocated to each of the plurality of storage devices.

7. The PCIe interface device of claim 6, wherein the RAID controller is further configured to control the plurality of storage devices to maintain the functions, divided according to the number of functions until the RAID-coupling is initialized.

8. The PCIe interface device of claim 5, wherein the RAID controller is further configured to:
output, to the host, allocation information indicating the number of the functions to be allocated to each of the storage devices, and
transfer, from the host to the plurality of storage devices by a predetermined method, function information allocating the number of functions to each of the storage devices.

9. The PCIe interface device of claim 8, wherein, when a storage device that does not support the predetermined method exists among the plurality of storage devices, the RAID controller is further configured to set, as the reference capacity, a capacity of the storage device that does not support the predetermined method.

10. The PCIe interface device of claim 9, wherein the RAID controller is further configured to:
determine the number of functions to be allocated to each of the plurality of storage devices based on the reference capacity; and
RAID-couple functions, divided according to the number of functions allocated to each of the plurality of storage devices based on the reference capacity.

11. A method of operating a Peripheral Component Interconnect Express (PCIe) interface device including a Redundant Array of Independent Disks (RAID) controller that controls RAID-coupling of a plurality of storage devices, the method comprising:
receiving, from the plurality of storage devices, pieces of size information indicating storage capacities of the respective storage devices;
setting a reference capacity based on the pieces of size information; and
requesting a host to allocate a number of functions to be executed in the plurality of storage devices based on a storage capacity of each of the plurality of storage devices and the reference capacity.

12. The method of claim 11, wherein each of the plurality of storage devices is a solid-state drive (SSD) device or a hard disk drive (HDD) device.

13. The method of claim 12, further comprising performing a reboot operation on the plurality of storage devices, each of which is the SSD device.

14. The method of claim 11, wherein the setting of the reference capacity comprises setting, as the reference capacity, a greatest common divisor of the storage capacities of the plurality of storage devices based on the received pieces of size information.

15. The method of claim 11, wherein the allocating of the storage capacity to each function comprises determining the number of functions to be allocated to each of the plurality of storage devices based on the reference capacity.

16. The method of claim 15, wherein the RAID-coupling is performed on the functions, divided according to the number of the functions allocated to each of the plurality of storage devices.

17. The method of claim 16, wherein the RAID-coupling the functions comprises maintaining the functions, divided according to the number of functions, until the RAID-coupling is initialized.

18. The method of claim 16, wherein the allocating of the storage capacity to each function comprises:
outputting, to the host, allocation information indicating the number of the functions to be allocated to each of the storage devices; and
transferring, from the host to the plurality of storage devices by a predetermined method, function information allocating the number of functions to each of the storage devices.

19. The method of claim 18, wherein the RAID-coupling the functions comprises:
determining the number of functions to be allocated to each of the plurality of storage devices based on the reference capacity; and
RAID-coupling functions, divided according to the number of functions allocated to each of the plurality of storage devices based on the reference capacity.

* * * * *